US008041656B2

(12) United States Patent  
Beck et al.

(10) Patent No.: US 8,041,656 B2  
(45) Date of Patent: Oct. 18, 2011

(54) METHOD AND APPARATUS FOR LEVERAGING END USER TERMINALS IN SELF-LEARNING NETWORKS

(75) Inventors: Andre Beck, Batavia, IL (US); Markus Andreas Hofmann, Fair Haven, NJ (US)

(73) Assignee: Alcatel Lucent, Paris (FR)

( * ) Notice: Subject to any disclaimer, the term of this patent is extended or adjusted under 35 U.S.C. 154(b) by 701 days.

(21) Appl. No.: 11/930,617

(22) Filed: Oct. 31, 2007

(65) Prior Publication Data

US 2009/0112778 A1   Apr. 30, 2009

(51) Int. Cl.  
*H04L 12/28* (2006.01)  
*G06F 15/18* (2006.01)

(52) U.S. Cl. .......................... 706/14; 370/254

(58) Field of Classification Search .................. None  
See application file for complete search history.

(56) References Cited

U.S. PATENT DOCUMENTS

| | | | |
|---|---|---|---|
| 6,510,139 B1 | 1/2003 | Yoshida | |
| 6,577,597 B1 * | 6/2003 | Natarajan et al. | 370/232 |
| 2003/0134631 A1 | 7/2003 | Snyder et al. | |
| 2005/0111467 A1 * | 5/2005 | Ng et al. | 370/401 |
| 2009/0257353 A1 * | 10/2009 | Song et al. | 370/241 |

FOREIGN PATENT DOCUMENTS

WO   WO 03/078459 A   9/2003

OTHER PUBLICATIONS

Dressler, Falko et al.; "Self-Organization in Ad Hoc Networks: Overview and Classification"; Feb. 2006; Univ. Erlangen, Dept. of Computer Science 7, Technical Report; pp. 1-12.*  
International Search Report and the Written Opinion of the International Searching Authority; PCT/US2008/012211; Lucent Technologies Inc., Applicant; dated Feb. 23, 2009; 17 pages.  
"Digital cellular telecommunications system (Phase 2+); Universal Mobile Telecommunications System (UMTS); IP Multimedia Subsystem (IMS); Stage 2 (3GPP TS 23.228 version 7.8.0 Release 7); ETSI TS 123 228" ETSI Standards, LIS, Sophia Antipolis Cedex, France, vol. 3-SA2, No. V7.8.0, Jun. 1, 2007, XP014037759 ISSN: 0000-0001, p. 66-p. 67.

* cited by examiner

*Primary Examiner* — Jeffrey A Gaffin  
*Assistant Examiner* — Stanley K Hill  
(74) *Attorney, Agent, or Firm* — Wall & Tong, LLP

(57) ABSTRACT

The invention includes a method and apparatus for configuring a self-learning network using feedback information received from an end user terminal communicating via the self-learning network. A method includes receiving feedback information from the end user terminal, generating configuration information for at least one network element of the self-learning network using the received feedback information, and configuring the at least one network element using the generated configuration information. The at least one network element of the self-learning network is configured by executing commands on each of the at least one network element and/or by propagating configuration information to each of the at least one network element. The feedback information may include user and/or terminal feedback information. The configuration information may include any information adapted for use in configuring the at least one network element of the self-learning network (and may also include configuration information for the end user terminal).

28 Claims, 7 Drawing Sheets

METHOD AND APPARATUS FOR LEVERAGING END USER TERMINALS IN SELF-LEARNING NETWORKS

FIELD OF THE INVENTION

The invention relates to the field of communication networks and, more specifically, to self-learning telephony networks.

BACKGROUND OF THE INVENTION

A self-learning or self-adapting telephony network is a network that automatically adapts its configuration or behavior based on feedback obtained from within the network. In one example, call routing tables in a Voice over Internet Protocol (VoIP) network may be modified automatically based on network traffic measurements obtained from active or passive network probes deployed at strategic locations within the VoIP network. In another example, call admission policies in a wireless access network may be modified automatically until an acceptable level of resource utilization is achieved.

SUMMARY OF THE INVENTION

Various deficiencies in the prior art are addressed through the invention of a method and apparatus for configuring a self-learning network using feedback information received from an end user terminal that is communicating via the self-learning network.

A method according to one embodiment includes receiving feedback information from the end user terminal, generating configuration information for at least one network element of the self-learning network using the received feedback information, and configuring the at least one network element of the self-learning network using the generated configuration information. The at least one network element of the self-learning network is configured by executing commands on each of the at least one network element and/or by propagating configuration information to each of the at least one network element.

The feedback information may include user feedback information and/or terminal feedback information. The configuration information may include one or more parameters to be configured on the at least one network element, one or more rules to be configured on the at least one network element, and/or any other information adapted for use in configuring the at least one network element of the self-learning network. The at least one network element of the self-learning network is configured according to the configuration information. The configuration information may also include configuration information for the end user terminal.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention leverages information that is available from end user terminals for use in configuring a self-learning communication network supporting communications for the end user terminals. Using the present invention, a self-learning network collects feedback information from end user terminals (e.g., including user feedback information from the end user and/or terminal feedback information from the end user terminal) and automatically configures one or more network elements of the self-learning network based on the feedback information. Thus, the present invention thereby enables the self-learning network to provide a better quality of service to the end users.

Figure 1:
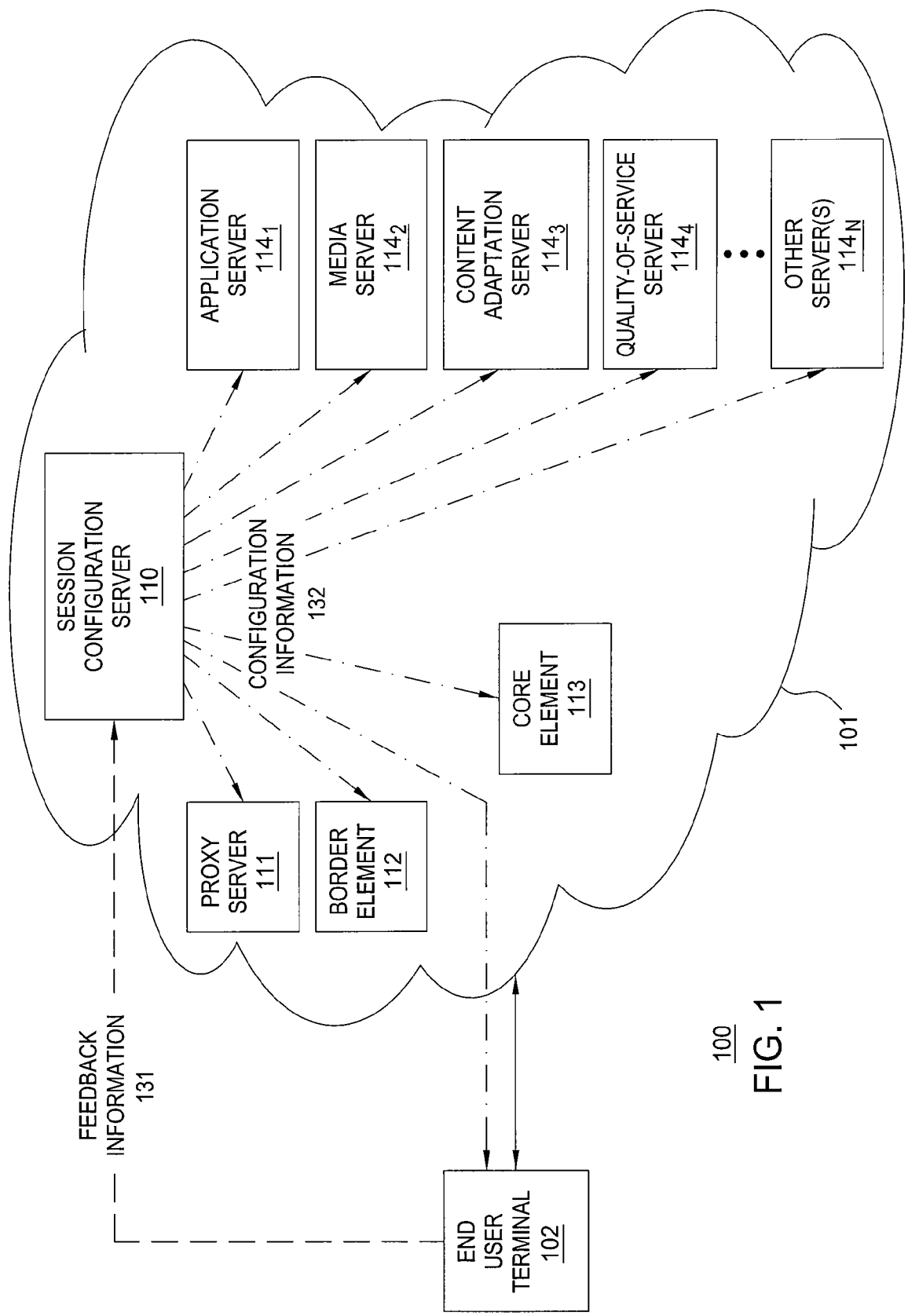
FIG. 1 depicts a high-level block diagram of a self-learning telephony communication network.

FIG. 1 depicts a high-level block diagram of a communication network. As depicted in FIG. 1, the communication network 100 includes a self-learning communication network 101 (i.e., denoted hereinafter as self-learning network 101, for short) adapted for supporting communications for end users using end user terminals (illustratively, end user terminal 102). As described herein, self-learning network 101 may be any network or combination of networks capable of supporting self-learning capabilities, including collecting feedback information from end user terminals (illustratively, end user terminal 102) and perform self-learning functions based on the collected feedback information.

As depicted in FIG. 1, in one embodiment self-learning network 101 is a packet-based network. In one embodiment, self-learning network 101 is an IP-based network capable of supporting various services, such as voice services, data services, multimedia services, and the like, as well as various combinations thereof. In one embodiment, for example, self-learning network 101 is an IP Multimedia Subsystem (IMS) network. In one such embodiment, self-learning network 101 may be an IMS network based, at least partly, on Session Initiation Protocol (SIP). Although primarily depicted and described herein as a packet-based network, in one embodiment self-learning network 101 may be a circuit-switched network.

As depicted in FIG. 1, self-learning network 101 (which, for purposes of clarity in describing the invention, is described within the context of a packet-based network rather than a circuit-switched network) includes network elements typically deployed in a packet-based network supporting multimedia services. For example, self-learning network 101 may include gateways, routers, servers, and the like, as well as various combinations thereof. As depicted in FIG. 1, for example, self-learning network 101 includes a proxy server 111, a border element 112, a plurality of core elements $113_1$-$113_N$ (collectively, core elements 113), and a plurality of servers $114_1$-$114_N$ (collectively, servers 114). The self-learning network 101 may include fewer or more network elements, as well as different network elements.

In one embodiment, for example, proxy server 111 may include a SIP proxy server. In one embodiment, for example, border element 112 and core elements 113 may include gateways and/or routers. In one embodiment, for example, servers 114 may include application servers (server $114_1$), media servers (server $114_2$), content adaptation servers (server $114_3$), quality-of-service servers (server $114_4$), and the like (server $114_N$), as well as various combinations thereof. The proxy server 111, border element 112, core elements 113, and servers 114 may include various other network elements which may be used to support communications between self-learning network 101 and end user terminal 102.

In one embodiment, for example, in which self-learning network 101 is an IMS network, border elements 111, core elements 112, and servers 113 may include network elements such as call session control functions (CSCFs) (e.g., proxy-CSCFs, serving-CSCFs, and interrogating-CSCFs), Home Subscriber Servers (HSSs), media servers, media gateways, media resources (e.g., media resource function controllers (MRFCs), media resource function processors (MRFPs), and the like), breakout gateway elements (e.g., breakout gateway control functions), application servers, and the like, as well as various combinations thereof.

The self-learning network 101 further includes a session configuration server (SCS) 110. The SCS 110 receives feedback information from end user terminals (illustratively, from end user terminal 102). The SCS 110 processes the feedback information in a manner for generating configuration information that is adapted for use in configuring self-learning network 101 based on the received feedback information. The SCS 110 controls configuration of one or more network elements of self-learning network 101 using the generated configuration information (e.g., SCS 110 configures one or more network elements, SCS 110 propagates configuration information toward one or more network elements, and the like, as well as various combinations thereof). The flow of feedback and configuration information within communication network 100 is depicted in FIG. 1.

The end user terminal 102 is an endpoint capable of communicating via self-learning network 101. The end user terminal 102 is adapted to provide feedback information to self-learning network 101. The capabilities of end user terminal 102 may depend on the type of network over which end user terminal 102 communicates.

In an embodiment in which self-learning network 101 is a packet-based network, end user terminal 102 may be an intelligent endpoint. In one such embodiment, for example, end user terminal 102 may include an IP phone, a mobile phone, a computer, and the like. In one embodiment, end user terminal 102 may include one or more applications adapted for accepting feedback from the end user associated with end user terminal 102, and providing the user feedback information to self-learning network 101. In one embodiment, end user terminal 102 may include one or more monitoring capabilities for monitoring the status of end user terminal 102 (e.g., for monitoring processing load, available capacity, battery status, and the like of end user terminal 102), and providing the terminal feedback information to self-learning network 101.

In an embodiment in which self-learning network 101 is a circuit-switched network, end user terminal 102 may be a dumb endpoint. In one such embodiment, for example, end user terminal 102 may include a standard Public Switched Telephone Network (PSTN) phone or other similar end user terminal. In such embodiments, the end user may provide user feedback information to self-learning network 101 via end user terminal 102. For example, the end user may provide user feedback information to self-learning network using touch-tone commands, an Interactive Voice Response (IVR) system, and the like, as well as various combinations thereof.

As depicted in FIG. 1, SCS 110 configures self-learning network 101 (and, optionally, end user terminal 102) using feedback information received from the end user terminal 102. The SCS 110 receives feedback information (feedback information 131) from the end user terminal 102. The SCS 110 generates configuration information (configuration information 132) using the feedback information. The SCS 110 configures one or more network elements of self-learning network 101 using the generated configuration information. In one embodiment, SCS 110 configures the network element(s) directly (e.g., by executing commands or other actions on each network element(s)). In one embodiment, SCS 110 configures the network element(s) indirectly (e.g., by propagating the configuration information toward the network element(s) for use in configuring the network element(s)).

Figure 2:
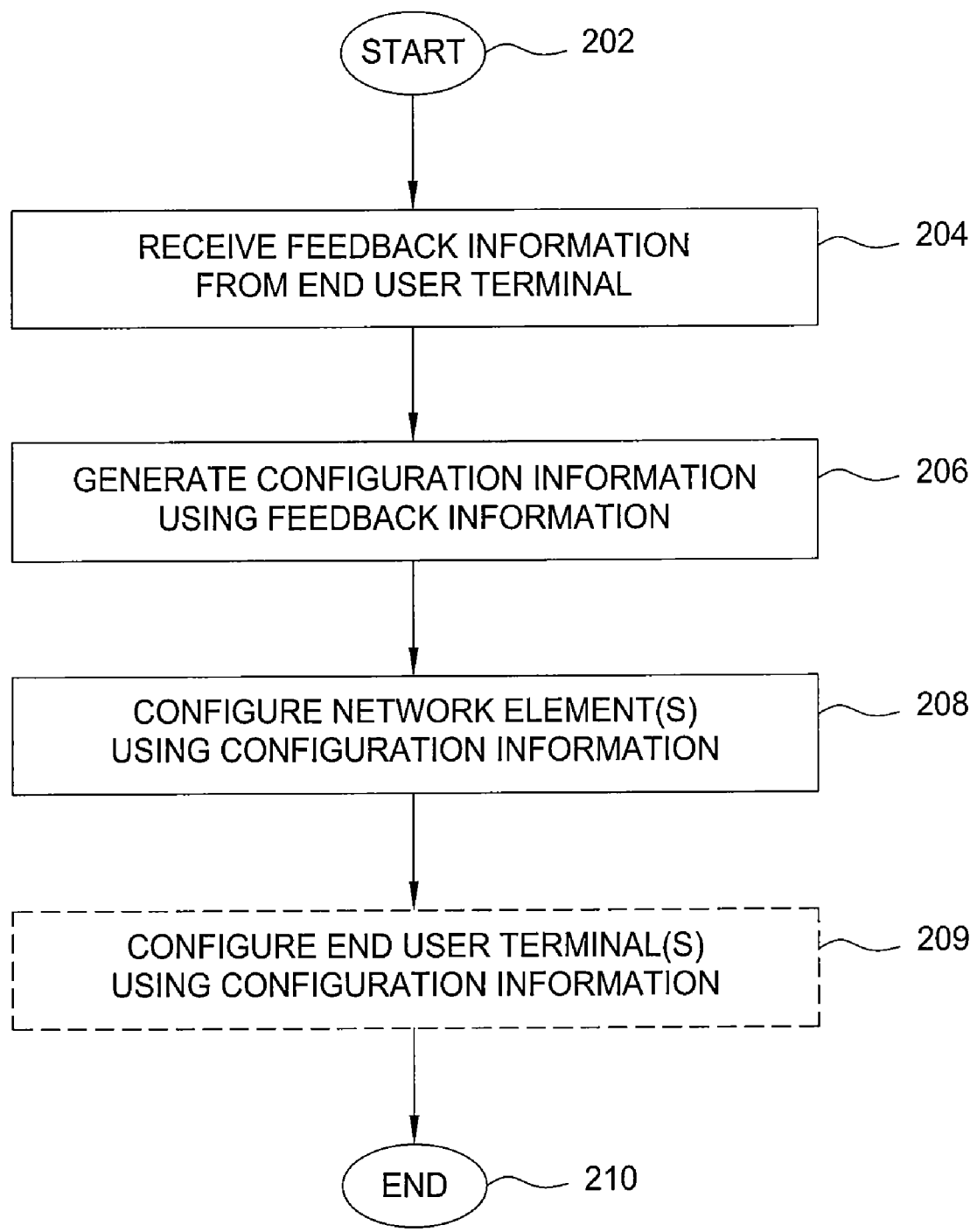
FIG. 2 depicts a method according to one embodiment of the present invention.

The operation of SCS 110 in performing network configuration based on feedback information received from an end user terminal may be better understood with respect to FIG. 2, as well as the examples depicted and described with respect to FIG. 3-FIG. 6.

FIG. 2 depicts a method according to one embodiment of the present invention. Specifically, method 200 of FIG. 2 includes a method for configuring a self-learning network based on feedback information received from an end user terminal. Although depicted and described as being performed serially, at least a portion of the steps of method 200 of FIG. 2 may be performed contemporaneously, or in a different order than depicted and described with respect to FIG. 2. The method 200 begins at step 202 and proceeds to step 204.

At step 204, feedback information is received. The feedback information is received by a network element (or network elements) in a self-learning network. The feedback information is received from an end user terminal in communication with the self-learning network. The feedback information received from the end user terminal is used by the self-learning network to adapt the configuration of one or more network elements of the self-learning network, such as gateways, routers, servers (e.g., proxy servers, application servers, media servers, QoS servers, and the like), and the like, as well as various combinations thereof. The feedback information may also be used to configure the end user terminal from which the feedback information is received.

The feedback information may include any information which may be provided from an end user terminal to a self-learning network. The feedback information may include feedback information that is provided by an end user via the end user terminal (which is referred to herein as user feedback information) and/or feedback information that is provided by the end user terminal (which is referred to herein as terminal feedback information).

The user feedback information received from the end user may include quality-of-service information (e.g., information about perceived quality-of-service, information about desired quality-of-service, and the like), call handling information (e.g., desired call handling, call importance, and the like), and the like, as well as various combinations thereof.

The information about perceived quality-of-service may include information indicating the overall perception of the quality-of-service being provided to the end user, information indicating the perception of the quality-of-service being provided to the end user for a particular service (e.g., for voice calls, for multimedia sessions, and the like), information indicating the perception of the quality-of-service being provided to the end user for a particular session (e.g., for a voice call, for a multimedia session, and the like), and the like, as well as various combinations thereof.

For example, the information about perceived quality-of-service may include information providing an indication that the end user is experiencing one or more undesirable conditions (e.g., delay, interruptions, echo, and the like, as well as various combinations thereof). In this example, the information about perceived quality-of-service may provide an indication that the end user is experiencing one or more undesirable conditions regularly, for a specific session (e.g., a current session that the end user is involved in, a session that the end user was previously involved in, and the like), and the like, as well as various combinations thereof.

The information about desired quality-of-service may include information indicating the overall quality-of-service desired by the end user, information indicating the quality-of-service desired by the end user for a particular service (e.g., for voice calls, for multimedia sessions, and the like), information indicating the quality-of-service desired by the end user for a particular session (e.g., for a voice call, for a multimedia session, and the like), and the like, as well as various combinations thereof.

For example, the information about desired quality-of-service may include, information providing an indication that one or more conditions are deemed by the end user to be undesirable (e.g., the end user deems delay, interruptions, echo, or other conditions which may be experienced by the end user, to be undesirable), information providing an indication of the importance of preventing certain undesirable conditions relative to other undesirable conditions (i.e., that certain undesirable conditions are more important to the end user than other undesirable conditions) and the like, as well as various combinations thereof.

The call handling information may include information about desired call handling, call importance, and like information. For example, call handling information may include requests from the user to handle calls to and/or from certain numbers in certain ways (e.g., automatically forwarding future calls from telemarketers to voicemail, preempting a call with one end user to answer an incoming call from a more important user, and the like, as well as various combinations thereof). The call handling information may include any other information specifying how the end user would like certain calls to be handled by the network.

The user feedback information may include any other information that may be provided from the end user to the self-learning network via the end user terminal. For example, the user feedback information may include information specifying the desired handling by the self-learning network of other types of sessions for the end user (e.g., data sessions, multimedia sessions, and the like), information specifying services that the end user would like to be able to access and/or utilize, and the like, as well as various combinations thereof.

The user feedback information may be collected from the end user at the end user terminal in a number of ways. The end user may be prompted to provide user feedback information and/or the end user may request to provide user feedback information (or may simply provide user feedback information without requesting to do so). The user feedback information may be collected from the end user in any format. For example, the user feedback information may be collected from the end user using a rigid question/answer format in which the user must select predefined answers to predefined questions, using a flexible question/answer format in which the user may provide answers to predefined questions, using a freeform format in which the user has more flexibility with respect to the feedback information which may be provided, and the like, as well as various combinations thereof.

In one embodiment, the end user device may include an end user feedback application adapted for collecting feedback information from the end user via the end user terminal. In one such embodiment, for example, where the end user is prompted to provide user feedback information, the end user feedback application may be launched automatically by the end user terminal (e.g., in response to an event such as establishment of a call, termination of a call, and the like). In another such embodiment, for example, where the end user requests to provide feedback information, the end user may launch the end user feedback application manually (e.g., during the call if the user experiences a problem, after the call if the user would like to ensure better quality of future calls, and the like, as well as various combinations thereof).

For example, in an embodiment in which a question/answer format is used to collected user feedback information, a question such as 'How satisfied are you with the quality of the call?' may be displayed on a display of the user device (e.g., display screen of a phone, computer monitor of a computer, and the like). The user may then select an answer to the question (e.g., VERY SATISFIED, SOMEWHAT SATISFIED, NOT SATISFIED, and the like) via a user input device (e.g., keypad on a phone, keyboard of a computer, and the like). The user feedback information may be obtained from the user in various other ways (i.e., it will be understood that this is merely one example of how user feedback information may be obtained from the user since various other question and/or answer combinations may be used to obtain user feedback information from the user via the user device).

In one embodiment, in which the end user feedback application uses a question/answer format, the answer to one question may determine whether additional questions are asked (and, if asked, which questions are asked). For example, assume that the initial question asked of the user is 'How satisfied are you with the quality of the call?'. In this example, if the user responds with an answer of VERY SATISFIED, the user is not prompted to answer any additional questions; however, if the user responds with an answer of SOMEWHAT SATISFIED or NOT SATISFIED, the user may be prompted to provide additional feedback by which the self-learning network may determine the source of the dissatisfaction (e.g., intolerable delay, call interruptions, and the like).

In one embodiment, in which the end user terminal is not capable of running such feedback applications, the end user may provide user feedback information in other ways. In one such embodiment, for example, the end user may provide user feedback information using a network-supported feedback capability (e.g., using a touchtone system, using an IVR system, and the like, as well as various combinations thereof). For example, user feedback information may be provided in such a manner where the end user terminal from which the user feedback information is being provided is not an intelligent endpoint (e.g., from PSTN phones of other end user terminals that communicate over circuit-switched networks).

The terminal feedback information received from the end user terminal may include information about local system conditions on the end user terminal. For example, the terminal feedback information may include information about the current processing load on the end user terminal, information about the remaining available storage capacity on the end user terminal, information about the current battery level of the end user terminal, information about capabilities of the end user terminal (e.g., terminal decoding capabilities, terminal media player capabilities, terminal screen size, and the like), and the like, as well as various combinations thereof. The terminal feedback information may include any other information associated with the end user terminal.

The terminal feedback information may be collected from the end user terminal in a number of ways. In one embodiment, for example, the end user terminal may be configured to monitor different systems of the end user terminal (e.g., the processor, memory, battery, and the like). In one such embodiment, for example, the end user terminal may be configured to monitor different systems of the end user terminal using associated thresholds. For example, the end user terminal may be configured to provide feedback when the current processing load on the end user terminal exceeds 80%, when the current available storage capacity on the end user terminal exceeds 90%, when the current battery level of the end user terminal is below 20%, and the like, as well as various combinations thereof.

The feedback information, including user feedback information and terminal feedback information, may be provided from the end user terminal to the self-learning network for each session (e.g., once per session, multiple times per session, periodically during each session, and the like), for selected ones of the sessions (e.g., selected by the end user, the end user terminal, and/or the self-learning network), when an event occurs on the end user terminal, when requested by the self-learning network (e.g., in response to a request from SCS 110), and the like, as well as various combinations thereof. The feedback information may be provided from the end user terminal to the self-learning network according to various other rules.

At step 206, configuration information is generated using the received feedback information. The configuration information is generated by the self-learning network. The configuration information that is generated may depend on the feedback information received from the end user terminal (i.e., different types of feedback information may require configuration of different network elements of the self-learning network for different purposes). As depicted and described herein with respect to FIG. 1, the configuration information may be generated to configure network elements such as gateways, routers, servers, and the like (and, optionally, one or more end user terminals).

The configuration information includes information adapted for configuring one or more network elements of the self-learning network based on the feedback information.

In one embodiment, for example, the configuration information may include one or more parameters intended to be configured on one or more network elements of the self-learning network. For example, the parameters may include quality of service parameters adapted for controlling a quality of service provided by a QoS server (e.g., jitter, packet loss, and the like), video encoding parameters adapted for controlling video encoding rate for a video server, compression rate parameters adapted for controlling media compression rate for a content adaptation server, and the like, as well as various combinations thereof.

In one embodiment, for example, the configuration information may include one or more rules intended to be provisioned on one or more network elements of the self-learning network. For example, the rules may include rules adapted for handling calls to and/or from the end user terminal (e.g., call handling rules stored on a proxy server), rules adapted for controlling a quality of service provided by a QoS server (e.g., reduce delay for the end user, reduce interruptions for the end user, and the like), and the like, as well as various combinations thereof.

The configuration information may include information adapted for configuring an end user terminal(s) based on the feedback information. For example, the configuration information may include information adapted to instruct the end user terminal to use a particular codec (e.g., to use a certain audio codec for a voice call, to use a certain video codec for a multimedia session, and the like), to use a particular media format, to use a particular protocol, and the like, as well as various combinations thereof.

The configuration information may include any other information that is adapted for configuring a network element of a self-learning network (and/or an end user terminal communicating over the self-learning network). The generation of configuration information based on feedback information may be better understood with respect to the examples depicted and described herein in FIG. 3-FIG. 6.

At step 208, the self-learning network is configured using the generated configuration information. The generated configuration information is used to configure one or more network elements of the self-learning network.

In one embodiment, one or more commands or other actions are executed on each of the one or more network elements. In one embodiment, for example, the network element(s) may be remotely accessed (e.g., using a remote login capability) and the one or more commands may be executed on each network element(s). The network element(s) may be accessed in any manner. Similarly, the command(s) or other actions may be executed on the network element(s) in any manner.

In one embodiment, the configuration information is propagated toward each of the one or more network elements of the self-learning network). The configuration information may be propagated toward the network element(s) in any manner (e.g., using any messaging protocols and associated message formats, which may vary depending on the type of configuration information to be propagated, the type of network element(s) to which the configuration information is to be propagated, and the type of self-learning network within which the configuration information is propagated). In one such embodiment, the network element(s) may configure itself using the received configuration information.

At step 209 (which is an optional step, depending on whether or not configuration information is generated for the end user terminal(s)), one or more end user terminals may be configured using the generated configuration information. In one embodiment, the end user terminal(s) may be configured directly. In one embodiment, the end user terminal(s) may be configured using configuration information propagated to each of the end user terminal(s). The end user terminal(s) may be configured using configuration information in any other manner.

The configuration of the self-learning network (and, optionally, one or more end user terminals) may be implemented in various other ways.

At step 210, method 200 ends. Although depicted and described as ending, method 200 will continue to be repeated for each end user terminal associated with the self-learning network in order to continue to adapt the self-learning network in a manner for providing improved quality of service to end users at the end user terminals based on feedback information received from the end users and/or end user terminals. Thus, although primarily depicted and described with respect to configuration of a self-learning network for one end user terminal from which feedback information is received, method 200 may be performed for each end user terminal from which feedback information is received.

Figure 3:
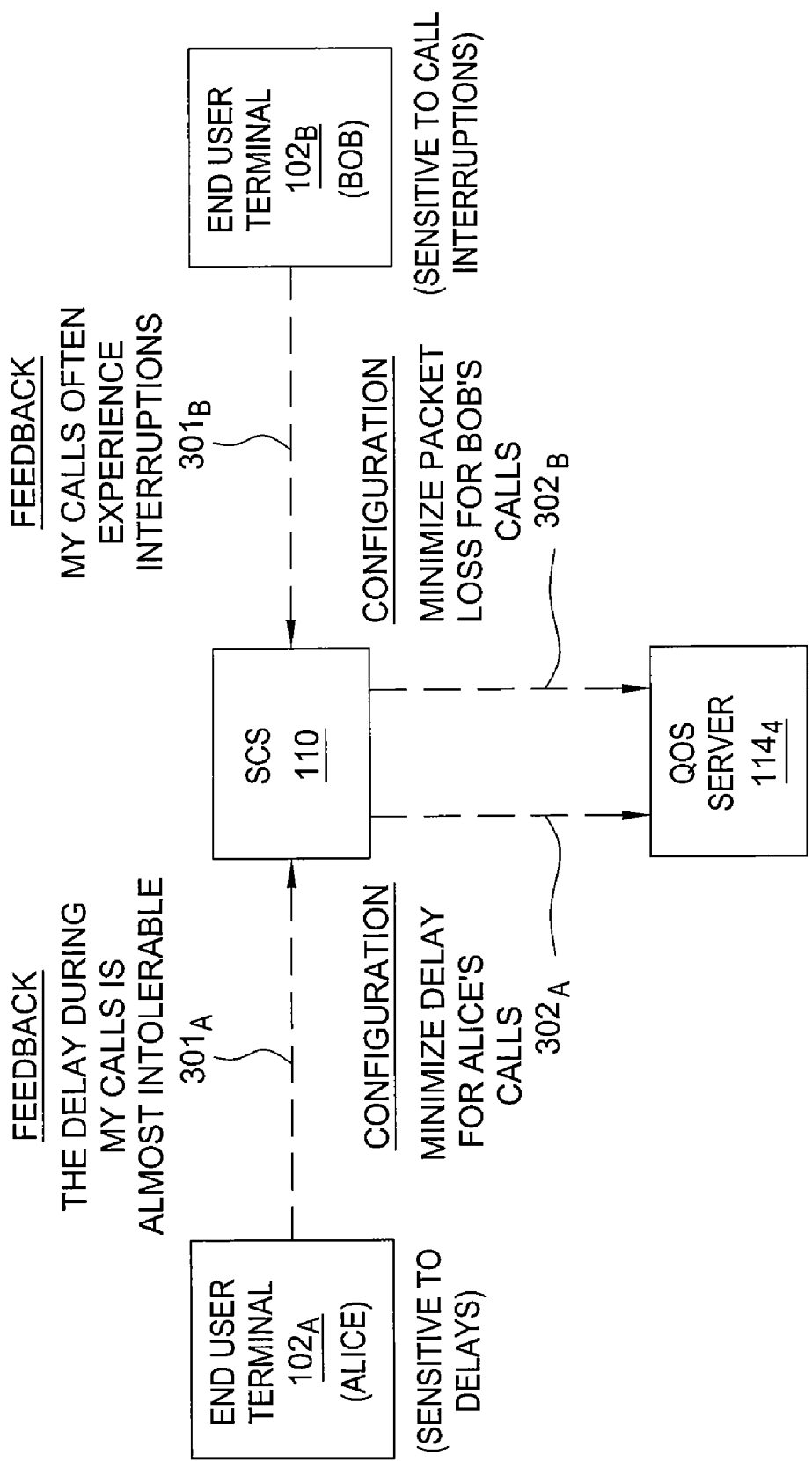
FIG. 3 depicts an example application of the present invention for an embodiment in which user feedback information is provided.

FIG. 3 depicts an example application of the present invention for an embodiment in which user feedback information is provided.

As depicted in FIG. 3, a first user (Alice) associated with a first end user terminal $102_A$ is participating in a telephone call. The end user Alice is sensitive to delays during her telephone calls. The end user Alice provides feedback information (denoted as feedback $301_A$) to the self-learning network (illustratively, to SCS 110) indicating that the delay that she is experiencing during her call (or calls) is intolerable. Upon receiving the feedback information from Alice, SCS 110 generates configuration information (denoted as configuration $302_A$) based on the feedback information.

The configuration information is adapted for configuring a QoS server (illustratively, QoS server $114_4$) to minimize delays for Alice's calls. The SCS 110 propagates the configuration information QoS server $114_4$. Thus, QoS server $114_4$ is configured such that the delay during Alice's calls is minimized (or at least reduced).

As further depicted in FIG. 3, a second user (Bob) associated with a second end user terminal $102_B$ is participating in a telephone call. The end user Bob is sensitive to interruptions during his telephone calls. The end user Bob provides feedback information (denoted as feedback $301_B$) to the self-learning network (illustratively, to SCS 110) indicating that he is experiencing a large number of interruptions during his call (or calls). Upon receiving the feedback information from Bob, SCS 110 generates configuration information (denoted as configuration $302_B$) based on the feedback information.

The configuration information is adapted for configuring a QoS server (illustratively, QoS server $114_4$) to minimize packet loss during Bob's calls and, thereby minimizing interruptions during Bob's calls. The SCS 110 propagates the configuration information to QoS server $114_4$. Thus, QoS server $114_4$ is configured such that the number of interruptions during Bob's calls is minimized (or at least reduced).

Figure 4:
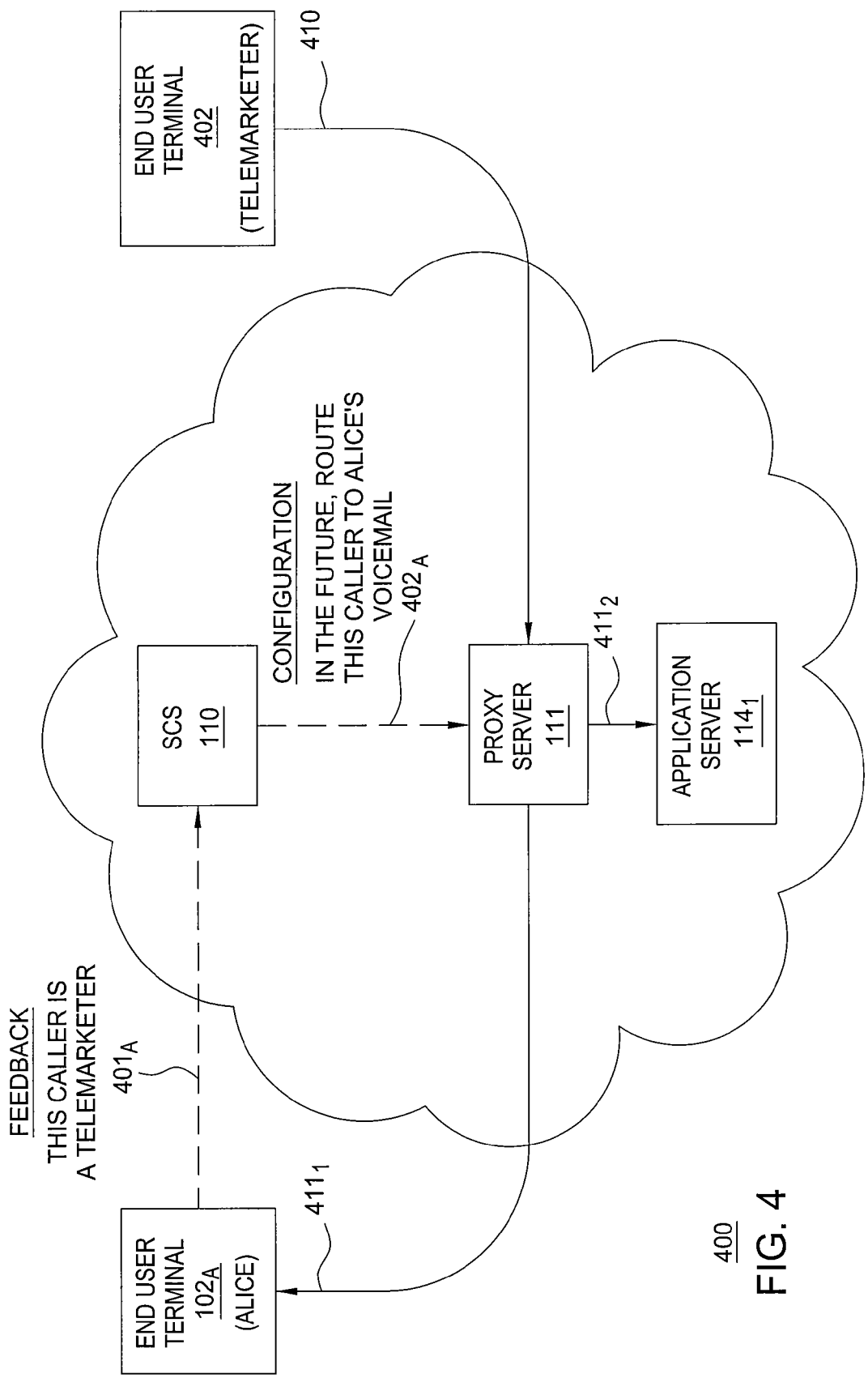
FIG. 4 depicts an example application of the present invention for an embodiment in which user feedback information is provided.

FIG. 4 depicts an example application of the present invention for an embodiment in which user feedback information is provided.

As depicted in FIG. 4, a user (Alice) associated with an end user terminal $102_A$ receives a telephone call from a telemarketer (illustratively, associated with end user terminal 402). The end user Alice does not want to receive calls from this telemarketer in the future. As such, Alice provides feedback information (denoted as feedback $401_A$) to the self-learning network (illustratively, to SCS 110) indicating that present call is a telemarketer. Upon receiving the feedback information from Alice, SCS 110 generates configuration information (denoted as configuration $402_A$) based on the feedback information.

The configuration information is adapted for configuring a proxy server (illustratively, proxy server 111) to route future calls from this telemarketer directly to Alice's voicemail. The SCS 110 propagates the configuration information to proxy server 111, thereby enabling proxy server 111 to forward future calls to Alice from that telemarketer to an application server (illustratively, application server $114_1$). Thus, proxy server 111 is configured such that Alice no longer receives calls from this telemarketer (i.e., future calls from the telemarketer are routed according to path 4112 rather than path 4111).

Figure 5:
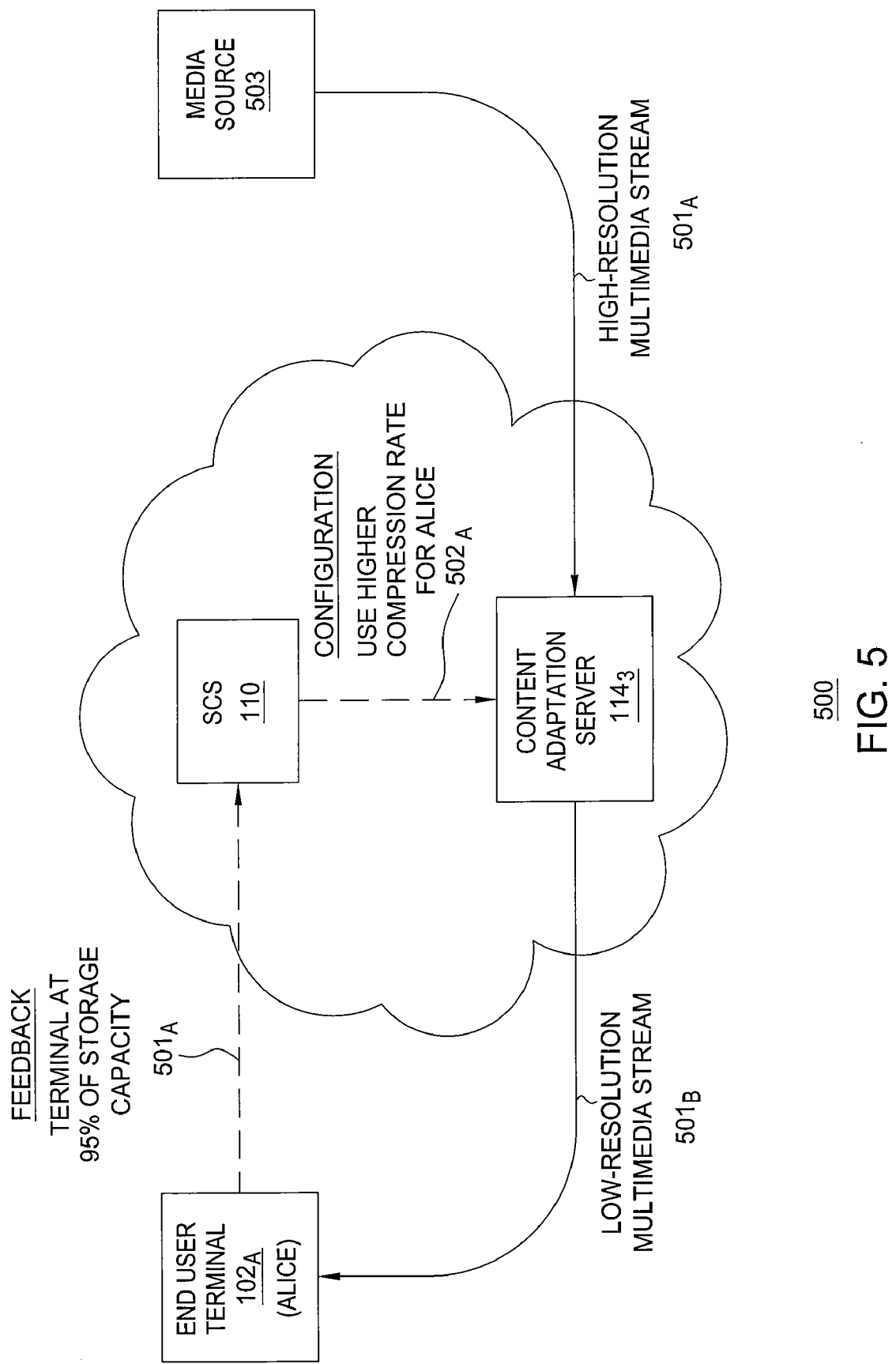
FIG. 5 depicts an example application of the present invention for an embodiment in which terminal feedback information is provided.

FIG. 5 depicts an example application of the present invention for an embodiment in which terminal feedback information is provided.

As depicted in FIG. 5, end user terminal $102_A$ is receiving a multimedia stream from a media source 503. The multimedia stream is initially provided as a high-resolution multimedia stream from media source 503 to end user terminal $102_A$. During the multimedia session, end user terminal $102_A$ detects that it is at 95% of its storage capacity. As such, end user terminal $102_A$ provides feedback information (denoted as feedback $501_A$) to the self-learning network (illustratively, to SCS 110) indicating that it is almost out of storage space. Upon receiving the feedback information from end user terminal $102_A$, SCS 110 generates configuration information (denoted as configuration $502_A$) based on the feedback information.

The configuration information is adapted for improving the utilization of the small amount of storage space remaining on end user terminal $102_A$. Specifically, the configuration information is adapted for configuring a content adaptation server (illustratively, content adaptation server $114_3$) to use a higher compression rate for providing the multimedia content from media source 503 to end user terminal $102_A$. The SCS 110 propagates the configuration information to content adaptation server $114_3$. Thus, content adaptation server $114_3$ is configured to convert a high-resolution multimedia stream $510_A$ received from media source 503 into a low-resolution multimedia stream $510_B$, which is provided to end user terminal $102_A$.

Figure 6:
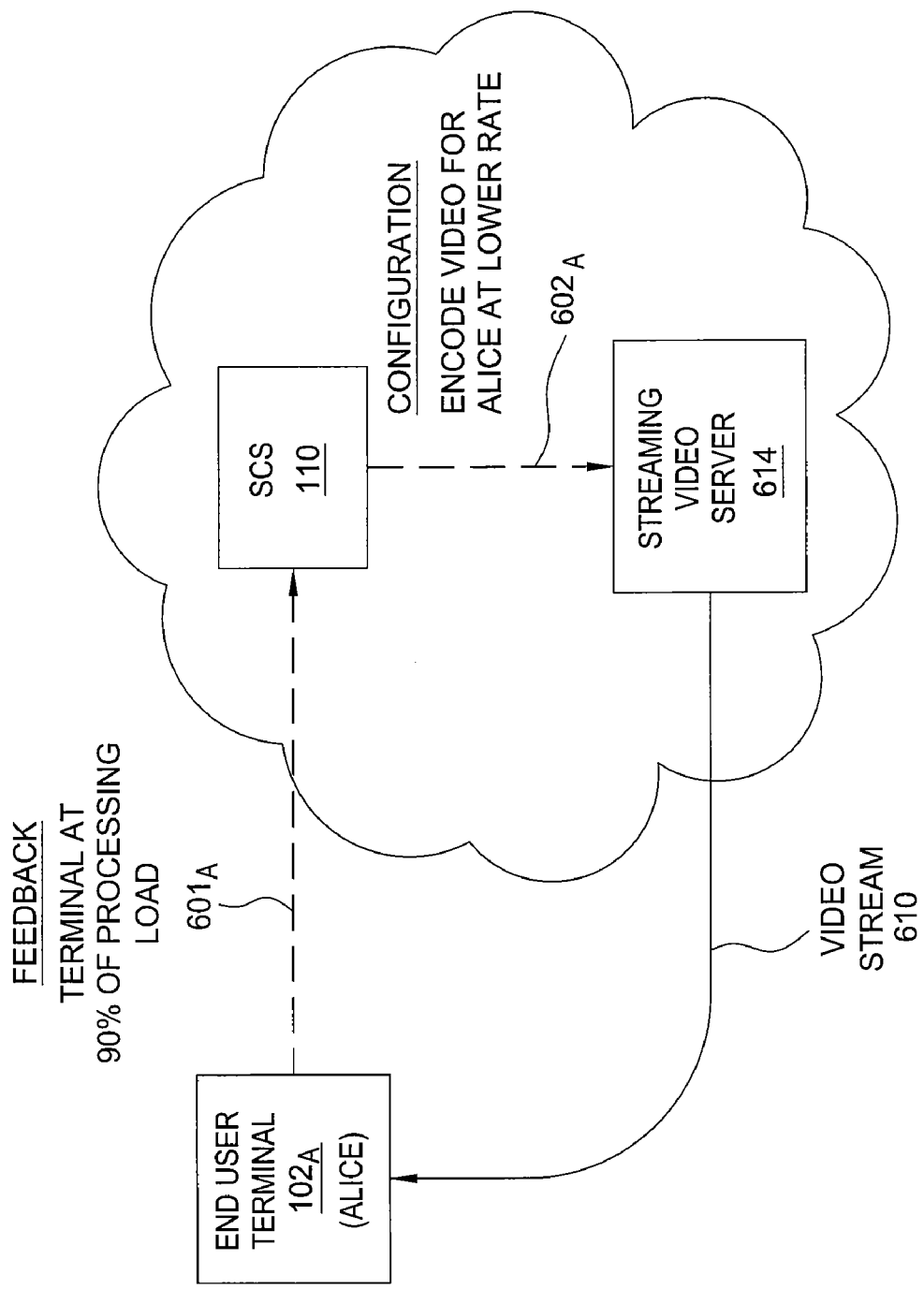
FIG. 6 depicts an example application of the present invention for an embodiment in which terminal feedback information is provided.

FIG. 6 depicts an example application of the present invention for an embodiment in which terminal feedback information is provided.

As depicted in FIG. 6, end user terminal $102_A$ is receiving a video stream from a streaming video server 614. The video stream is initially provided from streaming video server 614 to end user terminal $102_A$ using a high video encoding rate. During the streaming video session, end user terminal $102_A$ detects that it is at 90% of its processing load. As such, end user terminal $102_A$ provides feedback information (denoted as feedback $601_A$) to the self-learning network (illustratively, to SCS 110) indicating that it is almost out of processing capacity. Upon receiving the feedback information from end user terminal $102_A$, SCS 110 generates configuration information (denoted as configuration $502_A$) based on the feedback information.

The configuration information is adapted for improving the utilization of the small amount of processing capacity remaining on end user terminal $102_A$. Specifically, the configuration information is adapted for configuring streaming video server 614 to use a lower video encoding rate for providing the video stream to end user terminal $102_A$. The SCS 110 propagates the configuration information to streaming video server 614. Thus, streaming video server 614 is configured to provide a video stream 610 to end user terminal $102_A$, where video stream 610 uses a lower video encoding rate than was previously being used by streaming video server 614 before receiving the feedback information from end user terminal $102_A$.

Although specific examples of feedback information and configuration information are depicted and described with respect to FIG. 3-FIG. 6, it is understood that various other types of feedback information may be received from end user terminals and, further, it is understood that various other types of configuration information may be generated by the self-learning network using feedback information. Furthermore, various other types of network elements of a self-learning network may be configured in response to feedback information received from an end user terminal.

Although primarily depicted and described herein with respect to specific examples in which configuration information is propagated to the network element to be configured, such examples are merely provided for purposes of clarity in describing the present invention. In other embodiments, for example, the network element to be configured may be configured directly by the configuration controller (e.g., by logging into the network element remotely and executing one or more commands or other actions adapted to configure the network element).

Although primarily depicted and described herein with respect to specific examples in which feedback information received from one end user terminal is used to configure one network element (1:1), such examples are merely provided for purposes of clarity in describing the present invention. Thus, using the present invention, feedback information from one end user terminal may be used to configure multiple network elements (1:N), feedback information from multiple end user terminals may be used to configure one network elements (N:1), and/or feedback from multiple end user terminal may be used to configure multiple network elements (N:N).

Figure 7:
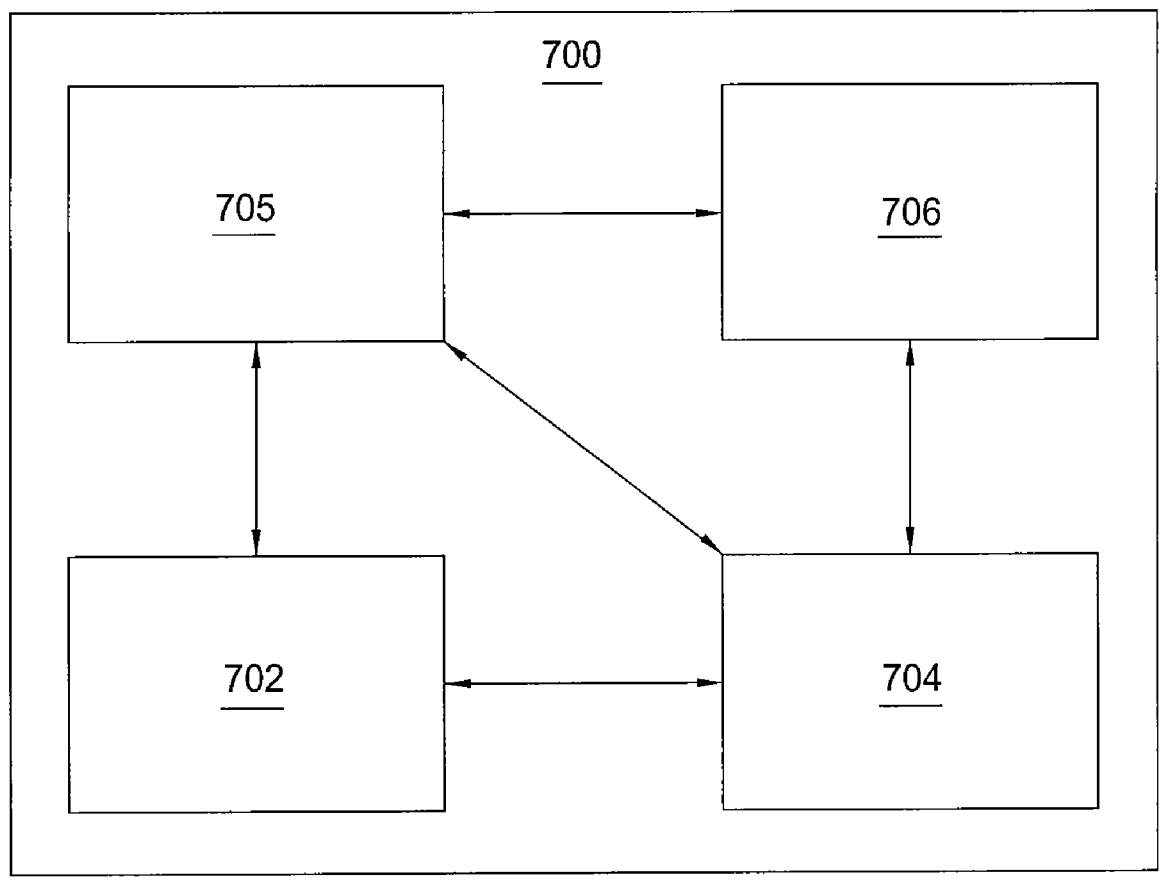
FIG. 7 depicts a high-level block diagram of a general-purpose computer suitable for use in performing the functions described herein.

FIG. 7 depicts a high-level block diagram of a general-purpose computer suitable for use in performing the functions described herein. As depicted in FIG. 7, system 700 comprises a processor element 702 (e.g., a CPU), a memory 704, e.g., random access memory (RAM) and/or read only memory (ROM), a feedback information processing and network configuration module 705, and various input/output devices 706 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present feedback information processing and network configuration process 705 can be loaded into memory 704 and executed by processor 702 to implement the functions as discussed above. As such, feedback information processing and network configuration process 705 (including associated data structures) of the present invention can be stored on a computer readable medium or carrier, e.g., RAM memory, magnetic or optical drive or diskette, and the like.

Although primarily depicted and described herein with respect to performing centralized network configuration using a session configuration server, the configuration control functions of the present invention may be provided using various other network elements (or combinations of network elements). In one embodiment, for example, SCS 110 may be implemented as an element management system (or at least a portion thereof), a network management system (or at least a portion thereof), and the like, as well as various combinations thereof. As described herein, this flexibility in the implementation of SCS 110 enables SCS 110 to perform configuration of the self-learning network in many different ways (e.g., directly by accessing network elements and executing commands, by propagating configuration information toward network elements, and the like).

Although primarily depicted and described herein with respect to performing centralized network configuration based on feedback information received from end user terminals, network configuration using feedback information received from end user terminals may be also performed in a distributed manner. In one embodiment, for example, feedback information collection and processing functions and configuration information generation and distribution functions of the present invention may be distributed across multiple elements (e.g., which may include multiple configuration server and/or existing network elements of the self-learning network). The feedback information collection and processing functions and configuration information generation and distribution functions of the present invention may be distributed in various other ways.

Although primarily depicted and described herein with respect to generating configuration information for network elements within the packet-based network, and propagating the configuration information to the network elements within the packet-based network, the present invention may also generate configuration information for an end user terminal (or end user terminals) and propagate the configuration information to the end user terminal(s). The end user terminal(s) configured using feedback information may include the end user terminal from which the feedback information was received and/or one or more other end user terminals (e.g., other end user terminals with which that end user terminal is currently communicating and/or with which that end user terminal may communicate in the future).

For example, the self-learning network (illustratively, SCS 110) may generate configuration information adapted to configure the end user terminal (illustratively, end user terminal 102). For example, SCS 110 may generate configuration information adapted to instruct the end user terminal to use a particular codec, to use a particular media format, to use a particular protocol, and the like, as well as various combinations thereof. The configuration information generated for the end user terminal may be either independent of configuration information generated for a network element(s) of the self-learning network or dependent on configuration information generated for a network element(s) of the self-learning network.

Although primarily depicted and descried herein with respect to specific types of feedback information and specific types of configuration information, the present invention may be adapted to collect and process various other types of feedback information and to generate and distribute various other types of configuration information. Although primarily depicted and described herein with respect to configuring network elements and/or end user terminals in a specific manner, network elements and/or end user terminals may be configured in any manner. Although primarily depicted and descried herein within the context of a specific type of packet-based network, the present invention may be utilized in any network supporting communications by end user terminals and capable of performing self-learning/self-adaptation.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for configuring a self-learning network, comprising:
   receiving feedback information from an end user terminal, wherein the end user terminal includes an end user feedback application collecting the feedback information from an end user, the end user feedback application being event triggered; and
   adapting configuration information for at least one network element of the self-learning network according to the received feedback information to thereby reconfigure the at least one network element.

2. The method of claim 1, wherein the feedback information comprises at least one of quality-of-service information and call handling information.

3. The method of claim 1, wherein thresholds associated with different systems comprise one of an upper limit and a lower limit.

4. The method of claim 1, wherein the feedback information is received at least one of once per call, in response to an event on the end user terminal, and in response to a request from the self-learning network.

5. The method of claim 1, wherein the configuration information comprises at least one of at least one parameter to be configured on the at least one network element and at least one rule to be configured on the at least one network element.

6. The method of claim 1, wherein the at least one network element comprises at least one of a border element, a core element, a proxy server, an application server, a media server, a quality-of-service server, and a content adaptation server.

7. The method of claim 1, further comprising:
   generating additional configuration information for the end user terminal; and
   propagating the additional configuration information toward the end user terminal.

8. The method of claim 1, further comprising:
   receiving the configuration information at each of the at least one network element of the self-learning network, wherein each of the at least one network element configures itself using the received configuration information.

9. The method of claim 1, wherein the received feedback information is associated with different systems of the end user terminal, said received feedback information being used to reconfigure a corresponding network element.

10. An apparatus for configuring a self-learning network, comprising:
    means for receiving feedback information from an end user terminal, wherein the end user terminal includes an end user feedback application collecting the feedback information from an end user, the end user feedback application being event triggered;
    means for adapting configuration information for at least one network element of the self-learning network according to the feedback information to thereby reconfigure the at least one network element; and
    means for executing commands on each of the at least one network element to thereby configure one or more rules for the at least one network element.

11. The apparatus of claim 10, wherein the feedback information comprises at least one of quality-of-service information and call handling information.

12. The apparatus of claim 10, wherein thresholds associated with different systems comprise one of an upper limit and a lower limit.

13. The apparatus of claim 10, wherein the feedback information is received at least one of once per call, in response to an event on the end user terminal, and in response to a request from the self-learning network.

14. The apparatus of claim 10, wherein the configuration information comprises at least one of at least one parameter to be configured on the at least one network element and at least one rule to be configured on the at least one network element.

15. The apparatus of claim 10, wherein the at least one network element comprises at least one of a border element, a core element, a proxy server, an application server, a media server, a quality-of-service server, and a content adaptation server.

16. The apparatus of claim 10, further comprising:
    means for generating additional configuration information for the end user terminal; and
    means for propagating the additional configuration information toward the end user terminal.

17. The apparatus of claim 10, further comprising:
    means for receiving the configuration information at each of the at least one network element of the self-learning network, wherein each of the at least one network element configures itself using the received configuration information.

18. A method for configuring a self-learning network, comprising:
    receiving feedback information from an end user terminal, wherein the end user terminal includes an end user feedback application collecting the feedback information from an end user, the end user feedback application being event triggered;
    generating configuration information for at least one network element of the self-learning network using the received feedback information; and
    configuring the at least one network element of the self-learning network by executing commands on each of the at least one network element according to the received feedback information to thereby configure one or more rules for the at least one network element.

19. The method of claim 18, wherein configuring the at least one network element using the generated configuration information comprises:
    logging into each of the at least one network element of the self-learning network; and
    executing at least one command on each of the at least one network element of the self-learning network.

20. The method of claim 18, wherein the received feedback information is associated with different systems of the end user terminal, said received feedback information being used to reconfigure a corresponding network element.

21. An apparatus for configuring a self-learning network, comprising:
    means for receiving feedback information from an end user terminal, wherein the end user terminal includes an end user feedback application collecting the feedback information from an end user, the end user feedback application being event triggered;
    means for generating configuration information for at least one network element of the self-learning network using the received feedback information; and
    means for configuring the at least one network element of the self-learning network by executing commands on each of the at least one network element according to the feedback information to thereby configure one or more rules for the at least one network element.

22. The apparatus of claim 21, wherein the means for configuring the at least one network element using the generated configuration information comprises:

means for logging into each of the at least one network element of the self-learning network; and means for executing at least one command on each of the at least one network element of the self-learning network.

23. The method of claim 21, wherein the received feedback information is associated with different systems of the end user terminal, said received feedback information being used to reconfigure a corresponding network element.

24. A method, comprising:

receiving, at a network element of a self-learning network, configuration information adapted for configuring the network element, wherein the configuration information is generated using feedback information received from at least one end user associated with an end user terminal communicating via the self-learning network, wherein the end user terminal includes an end user feedback application collecting the feedback information from the end user, the end user feedback application being event triggered, wherein the feedback information comprises information adapted for configuring the end user terminal; and executing commands on each of the at least one network element according to the feedback information to thereby configure one or more rules for the at least one network element.

25. The method of claim 24, wherein the feedback information comprises at least one of quality-of-service information and call handling information.

26. The method of claim 24, wherein thresholds associated with different systems comprise one of an upper limit and a lower limit.

27. The method of claim 24, wherein the configuration information comprises at least one of at least one parameter to be configured on the at least one network element and at least one rule to be configured on the at least one network element.

28. The method of claim 24, wherein the received feedback information is associated with different systems of the end user terminal, said received feedback information being used to reconfigure a corresponding network element.

* * * * *